United States Patent [19]
Kim

[11] Patent Number: 5,795,357
[45] Date of Patent: Aug. 18, 1998

[54] ELECTRODE MANUFACTURING METHOD FOR RECHARGEABLE BATTERIES

[75] Inventor: Jin-soo Kim, Kyungki-do, Rep. of Korea

[73] Assignee: Samsung Display Devices Co., Ltd., Kyungki-do, Rep. of Korea

[21] Appl. No.: 918,679

[22] Filed: Aug. 21, 1997

Related U.S. Application Data

[63] Continuation-in-part of Ser. No. 783,121, Jan. 14, 1997, abandoned.

[30] Foreign Application Priority Data

May 15, 1996 [KR] Rep. of Korea ............... 1996-16154

[51] Int. Cl.$^6$ ............... H01M 4/04; B05D 5/12
[52] U.S. Cl. ............... 29/623.5; 427/58; 427/211; 118/249
[58] Field of Search ............... 427/58, 211, 428; 29/623.5; 118/249, 248, 258; H01M 4/04

[56] References Cited

U.S. PATENT DOCUMENTS

| | | | |
|---|---|---|---|
| 4,177,304 | 12/1979 | Berry | 427/211 X |
| 4,493,857 | 1/1985 | Knigge et al. | 427/211 X |
| 4,932,443 | 6/1990 | Karolek et al. | 29/623.5 X |

*Primary Examiner*—John S. Maples
*Attorney, Agent, or Firm*—Christie, Parker & Hale, LLP

[57] ABSTRACT

Disclosed is an electrode manufacturing method for rechargeable batteries which includes the process of coating a binder on positive and negative electrodes of a rechargeable battery, wherein the process of coating is realized by passing positive and negative electrodes through rollers, mounted facing each other and which receive a supply of aqueous binder for application.

3 Claims, 2 Drawing Sheets

PRIOR ART

1

ELECTRODE MANUFACTURING METHOD FOR RECHARGEABLE BATTERIES

CROSS-REFERENCE TO RELATED APPLICATION

This is a continuation-in-part of application Ser. No. 08/783,121, filed Jan. 14, 1997, now abandoned.

BACKGROUND

The present invention relates to an electrode manufacturing method for rechargeable batteries, and more particularly, to an electrode manufacturing method in which, when manufacturing a positive electrode and a negative electrode of a battery, the coating of a binder can be effectively realized.

As is well known, rechargeable batteries are batteries that are able to be re-used by recharging. There are many types of rechargeable batteries including nickel-cadmium batteries, Ni-MH batteries, lead storage batteries, etc. Among these, there has recently been a sharp increase in the use of Ni-MH batteries as they are less harmful to the environment than the other types of rechargeable batteries.

In the above Ni-MH batteries, a nickel hydroxide is normally used for the positive electrode, and a hydrogen storage alloy is used for the negative electrode. When being charged, the water in the electrolytes is resolved, and the hydrogen storage alloy absorbs the hydrogen. When discharging electricity, hydrogen is discharged into the electrolytes. By the above process, the battery can be used and recharged repeatedly.

In the manufacturing process of the positive electrodes and negative electrodes of the nickel-hydrogen battery, a binder is coated on both electrodes to prevent the removal of an active material in the case of the positive electrode, and to increase hydrophobic properties on a face of the electrode in the case of the negative electrode.

There are two types of coating methods used in the prior art: a deposition method and a spray method. The deposition method is normally used for the positive electrode, and the spray method for the negative electrode. The two different methods are illustrated in FIGS. 2 and 3.

FIG. 2 illustrates the deposition method for coating the binder on the positive electrode. As shown in the drawing, the binder is coated on a positive electrode 1 by passing the positive electrode 1 through a deposition tub 9, filled with an aqueous solution, on rollers 3, 5, and 7. And as shown in FIG. 3, in the spray method for coating binder on the negative electrode, a negative electrode 11 receives a coating of binder through a spray nozzle 13 which sprays a solution of binder on a top face of the negative electrode 11.

In the prior art electrode manufacturing method using the above coating methods, however, there are a number of drawbacks. They include:

I. Coating binder on the positive electrode.

A. When the positive electrode passes through the inside of the deposition tub, some of the active material on the surface of the electrode is removed, reducing the capacity of the battery.

B. As the positive electrode is simply deposited in the deposition tub, it is difficult to control an exact amount and thickness of the binder.

C. High manufacturing costs are incurred as a result of having to repeatedly change the aqueous binder.

D. When depositing the positive electrode in the deposition tub, as swelling occurs in the binder when the aqueous binder permeates the positive electrode, a repressing operation must be performed, resulting in an increase in the number of total operations needed in the manufacturing process.

II. Coating binder on the negative electrode.

A. To improve the spraying of the aqueous binder, an organic solvent is added to the binder. However, composition is difficult to control.

B. Because the spraying of the binder and its thickness change according to the state of the nozzle, it is difficult to maintain a consistent thickness and quality of the sprayed binder.

SUMMARY

The present invention has been made in an effort to solve the above problems.

It is an object of the present invention to provide an electrode manufacturing method for rechargeable batteries that not only improves the manufacture of rechargeable batteries by reducing the number of steps needed in the coating of a binder to electrodes of a rechargeable battery, but also allows a high-quality adhesive coating to be easily applied to the electrodes.

To achieve the above objective, the present invention provides an electrode manufacturing method for rechargeable batteries which includes the process of coating a binder on positive and negative electrodes of a rechargeable battery, wherein the process of coating is realized by passing positive and negative electrodes through rollers, mounted facing each other and which receive a supply of aqueous binder for application.

According to a feature of the present invention, an outside circumference of the rollers is formed by using a material that can absorb the aqueous binder.

BRIEF DESCRIPTION OF THE DRAWINGS

Further objectives and other advantages of the present invention will become apparent from the following description in conjunction with the attached drawings, in which.

DESCRIPTION

Preferred embodiments of the present invention will now be described in detail with reference to the accompanying drawings.

Figure 1:
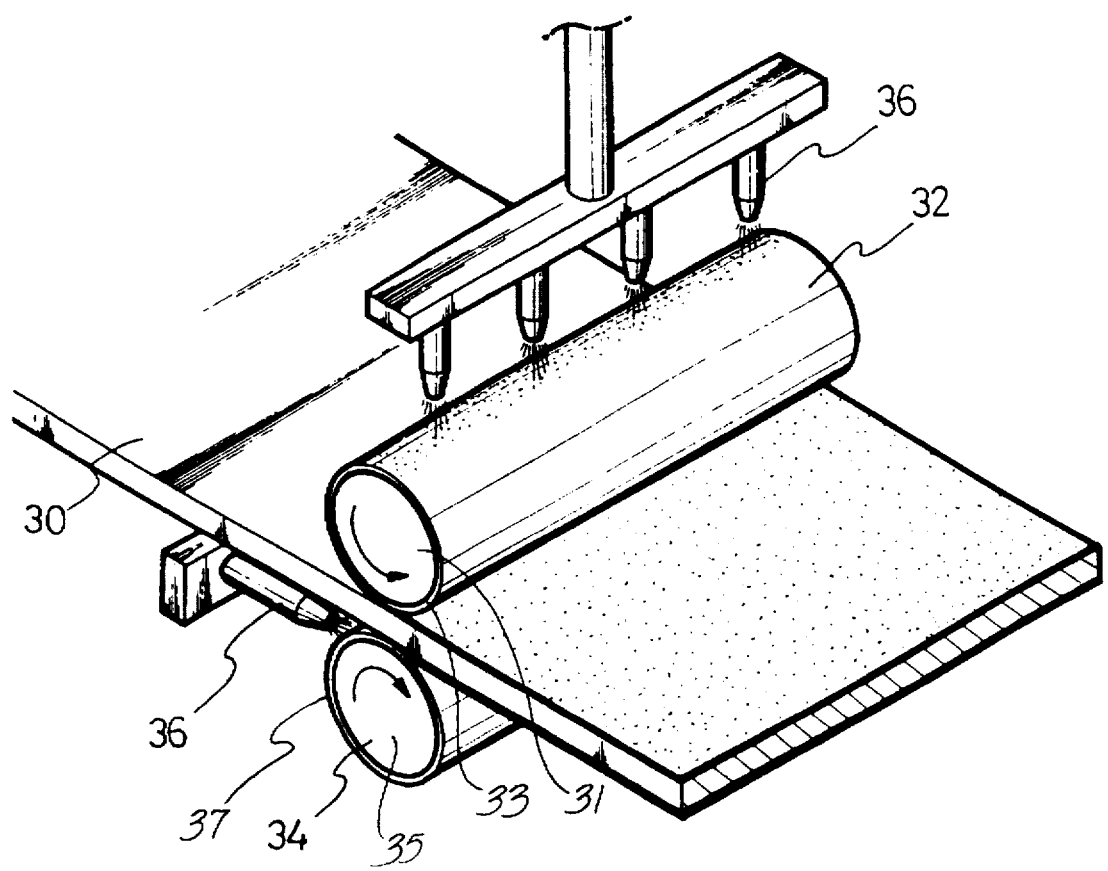
FIG. 1 is a schematic perspective view showing an electrode manufacturing method for rechargeable batteries in accordance with a preferred embodiment of the present invention.
Figure 2:
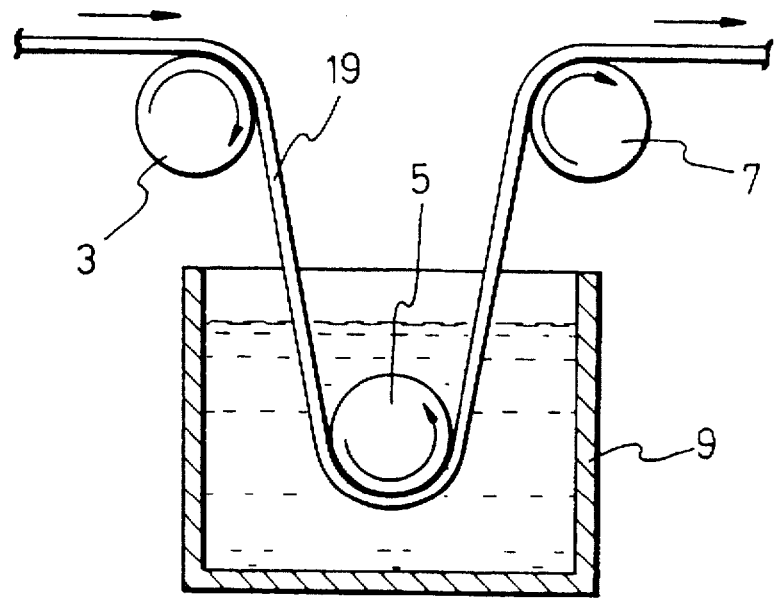
FIGS. 2 and 3 are views showing an electrode manufacturing method for rechargeable batteries of the prior art.
Figure 3:
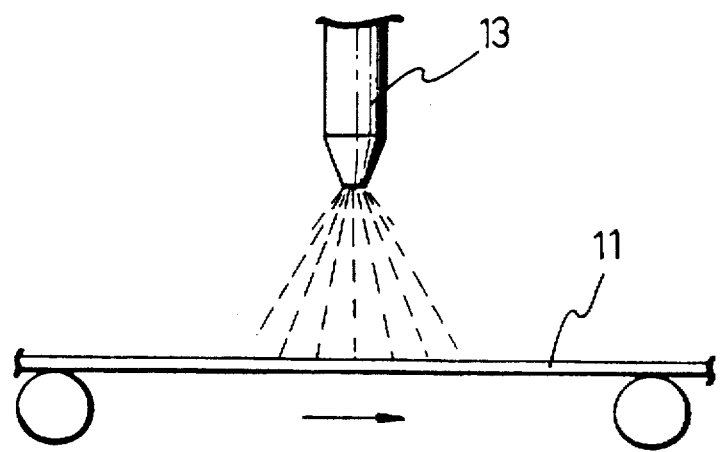

Referring to FIG. 1, shown is a schematic perspective view showing a method of coating a binder to positive and negative electrodes of a rechargeable battery.

As is illustrated, the present invention is structured such that a positive electrode or a negative electrode 30 passes between rotating roller members 32 and 34 to receive a coating of binder. For purposes of distinguishing the method of the present invention from that of the prior art, this method will be referred to as a roll coating method.

The above rotating roller members 32 and 34 are rotatably mounted facing one another. Although only one pair of rotating rollers member 32 and 34 are shown in the drawing of the present invention, more roller members can be added to further enhance thickness control of the binder.

The space between the two rotating roller members 32 and 34 is adjusted to a degree such that a desired thickness of the binder can be attained. In addition, the roller member 32 comprises a roller 31 and an aqueous material absorbing member 33 which is disposed around an outer surface of the roller 31. The roller member 34 also comprises a roller 35 and an aqueous material absorbing member 37 which is disposed around an outer surface of the roller 35. Preferably, the aqueous material absorbing members 33 and 37 are made of a fibrous material.

The aqueous material absorbing members 33 and 37 are supplied with the aqueous or liquid binder as the rollers 31 and 35 rotate. The supply of the binder to the aqueous material absorbing members 33 and 37 is realized through supply nozzles 36.

The supply nozzles 36 are mounted so that they are able to supply an even coating of aqueous binder on the outer circumference of the rotating roller member 32 and 34. As with the rotating roller member 32 and 34, the number of supply nozzles 36 can be increased to improve thickness control of the binder.

The operation of the present invention structured as in the above will now be explained.

First, the roller members 31 and 35 are rotated. The outer circumference of the aqueous material absorbing members 33 and 35 are then supplied with the aqueous binder from the supply nozzles 36.

In this state, a user passes an electrode 30 through the roller members 32 and 34. As the electrode 30 passes through aqueous absorbing members 33 and 37, the outer circumferences of which are absorbent, the electrode 30 receives a coating of binder on its surface.

In the above, as the roller members 32 and 34 are rotated at a controlled speed, an appropriate amount of binder desired by the user can be coated on the surface of the electrode 30. After the coating process, the electrode 30 undergoes a drying process.

The chart below is a comparison between the binder coating method of the present invention, the roll coating method, and that of the prior art (deposition method, spray method).

|  | roll coating | deposition | spray |
| --- | --- | --- | --- |
| active material removal | no | yes | no |
| electrode swelling | no | large amt. | small amt. |
| binder | aqueous solution | aqueous solution | organic solvent |

-continued

|  | roll coating | deposition | spray |
| --- | --- | --- | --- |
| binder consumption | small amt. | large amt. | medium amt. |
| control of coating amount | easy | highly difficult | somewhat difficult |

As can be seen in the above chart, the present invention has significant advantages compared to that of the prior art. The following is an explanation of these advantages.

First, because the amount of binder coating can be easily controlled, a binder coating layer can be formed on the electrodes at a desired thickness. This ability to control the thickness of the binder is made possible by controlling the number of supply nozzles which allows control of the amount of aqueous binder sprayed onto the rotating rollers. Also, thickness is controlled by controlling the rotating speed of the rotating rollers.

In addition, as the binder is supplied in an aqueous state in the present invention, problems resulting from the mixing of the organic solvent in the prior art can be avoided.

Finally, the problem of swelling in the binder when using the deposition method can be greatly reduced in the present invention as rotating rollers are used directly on the surface of the electrodes to apply the binder.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for coating a rechargeable battery electrode with an aqueous binding material, comprising the steps of:
   spraying opposing roller members with the aqueous binding material; and
   passing the electrode through the roller members to coat the electrode with the aqueous binding material sprayed onto the roller members.

2. A method according to claim 1 wherein each of the roller members comprises a roller and means for absorbing an aqueous material, said absorbing means being disposed around the roller.

3. A method according to claim 2 wherein said absorbing means comprises a fibrous material.

\* \* \* \* \*